United States Patent [19]

Jaeger et al.

[11] Patent Number: 5,200,490

[45] Date of Patent: Apr. 6, 1993

[54] POLYURETHANE VINYL ETHERS

[75] Inventors: Ulrich Jaeger; Erich Beck, both of Harthausen; Michael Karcher, Schwetzingen, all of Fed. Rep. of Germany

[73] Assignee: BASF Aktiengesellschaft, Ludwigshafen, Fed. Rep. of Germany

[21] Appl. No.: 838,846

[22] Filed: Feb. 21, 1992

[30] Foreign Application Priority Data

Mar. 23, 1991 [DE] Fed. Rep. of Germany ....... 4109649

[51] Int. Cl.⁵ .............................................. C08G 18/38
[52] U.S. Cl. ........................................ 528/49; 521/902
[58] Field of Search ........................... 528/49; 521/902

[56] References Cited

U.S. PATENT DOCUMENTS

| | | | |
|---|---|---|---|
| 4,359,541 | 11/1992 | Patton et al. | 528/49 |
| 4,751,273 | 6/1988 | Lapin | 525/488 |
| 4,775,732 | 10/1988 | Lapin | 528/49 |

FOREIGN PATENT DOCUMENTS

WO90/02614 3/1990 World Int. Prop. O. .

*Primary Examiner*—Maurice J. Welsh
*Attorney, Agent, or Firm*—Oblon, Spivak, McClelland, Maier & Neustadt

[57] ABSTRACT

Polyurethane vinyl ethers are obtainable by reacting
A) 1 NCO equivalent of one or more isocyanurate-containing polyisocyanates with
B) 0.01-1.0 OH equivalent of one or more monohydroxyvinyl ethers and
C) 0-0.99 equivalent of functional groups of further compounds, which groups are reactive with OCN.

8 Claims, No Drawings

POLYURETHANE VINYL ETHERS

The present invention relates to polyurethane vinyl ethers, obtainable by reacting
- A) 1 NCO equivalent of one or more isocyanurate-containing polyisocyanates with
- B) 0.01–1.0 OH equivalent of one or more monohydroxyvinyl ethers and
- C) 0–0.99 equivalent of functional groups of further compounds, which groups are reactive with OCN.

The present invention furthermore relates to radiation-curable materials which contain the polyurethane vinyl ethers.

Radiation-curable materials based on vinyl ether compounds are of interest, inter alia because of their curing rate. Vinyl ethers are generally prepared by reacting alcohols with acetylene and undergo polymerization with a cationic mechanism. Vinyl ethers having a relatively high molecular weight are obtainable, for example, by partial etherification of diols with acetylene and subsequent reaction of the remaining hydroxyl groups of the diols used with carboxylic acid or isocyanate compounds.

U.S. Pat. No. 4,775,732 and U.S. Pat. No. 4,751,273 disclose polyurethane vinyl ethers prepared in a corresponding manner. The isocyanate compounds used are diisocyanates or reaction products of diisocyanates with polyols.

WO 90/02614 describes radiation-curable materials which contain polyurethane vinyl ethers obtained from aromatic diisocyanates having two phenyl rings.

In many applications, particularly high requirements are set with regard to the hardness of coatings and moldings. Furthermore, particularly short curing times are generally desirable for industrial applications.

The radiation-curable materials known to date and based on polyurethane vinyl ethers do not yet meet these requirements to the desired extent.

It is an object of the present invention to provide polyurethane vinyl ethers which give particularly hard coatings and moldings after very short radiation curing.

We have found that this object is achieved by the polyurethane vinyl ethers defined above.

The novel polyurethane vinyl ethers are obtainable by reacting
- A) 1 NCO equivalent of one or more isocyanurate-containing polyisocyanates with
- B) 0.01–1.0, preferably 0.3–1.0, particularly preferably 0.6–1.0, very particularly preferably 0.8–1.0, and
- C) 0–0.99, preferably 0–0.7, particularly preferably 0–0.4, very particularly preferably 0–0.2, equivalent of functional groups of further compounds, which groups are reactive with isocyanate.

The isocyanurate-containing polyisocyanates A) are trimerization products of polyisocyanates, in particular of diisocyanates.

For example, aliphatic or cycloaliphatic compounds A), preferably those based on $C_1$–$C_{12}$-alkylene diisocyanates, particularly $C_2$–$C_8$-alkylene diisocyanates, such as hexamethylene diisocyanate, or on $C_5$–$C_{18}$-cycloalkylene diisocyanates, in particular $C_6$–$C_{16}$-cycloalkylene diisocyanates, in particular isophorone diisocyanate, are suitable. Aromatic compounds A), in particular those based on $C_5$–$C_{19}$-arylene, preferably $C_6$–$C_{16}$-arylene, or alkylarylene diisocyanates, such as phenylene 1,4-diisocyanate, toluylene 2,4-diisocyanate, toluylene 2,6-diisocyanate, diphenyl 4,4'-diisocyanate, diphenylmethane 4,4'-diisocyanate or naphthalene 1,5-diisocyanate, are also suitable.

Particularly great hardnesses, for example of coatings, can be achieved with aromatic compounds A). Polyurethane vinyl ethers based on aliphatic compounds A) may require a smaller amount of solvent for establishing the processing viscosity, owing to their generally low solution viscosity compared with those based on aromatic compounds A).

Compounds A) which are synthesized from a mixture of a total of from 10 to 90, particularly preferably from 20 to 80, very particularly preferably from 30 to 70, mol % of an aliphatic or cycloaliphatic compound A), in particular of a $C_2$–$C_8$-alkylene diisocyanate, and from 10 to 90, particularly preferably from 30 to 70, mol % of an aromatic compound A), in particular of a $C_6$–$C_{16}$-arylene or alkylarylene diisocyanate, are therefore particularly preferred.

The trimerization of polyisocyanates, in particular diisocyanates, can be carried out in a manner known to the skilled worker at elevated temperature, in particular at from 50° to 150° C., with or without the addition of a catalyst, for example a trialkylphosphine, such as tributylphosphine, or, for example, trimethylbenzylammonium hydroxide, as described, for example, in Encyclopedia of Chem. Technology, Vol. 13, page 794 (1978).

In addition to polyisocyanates having one isocyanurate group, for example triisocyanatoisocyanurates as trimers of 3 molecules of diisocyanate, those having a plurality of isocyanurate groups are also formed in the trimerization reaction.

Compounds A) preferably contain not less than 50, particularly preferably not less than 70%, by weight of polyisocyanates having one isocyanurate group.

The average molecular weight of the compounds A) is preferably from 300 to 3,000, particularly preferably from 300 to 1,000, g/mol.

Examples of suitable monohydroxyvinyl ethers B) are vinyl ethers of aliphatic or cycloaliphatic or aromatic diols, polyols or polyesterols in which all except one hydroxyl group have been etherified.

Monohydroxy-$C_1$–$C_8$-alkyl vinyl ethers, in particular monohydroxy-$C_1$–$C_6$-alkyl vinyl ethers, e.g. 4-hydroxybutyl vinyl ether, 3-hydroxypropyl vinyl ether and 2-hydroxyethyl vinyl ether, are preferred.

Monohydroxy vinyl ethers can be obtained, for example, by the known reaction of the abovementioned alcohols with corresponding amounts of acetylene in the presence of potassium hydroxide.

The further compounds C) which have functional groups which are reactive with isocyanate may be, for example, compounds having primary or secondary amino groups or hydroxyl groups.

Compounds having a plurality of these functional groups are also suitable, for example, as chain extenders. The crosslinking agents may also contain vinyl ether groups. An example is trimethylolpropane monovinyl ether.

Preferred compounds C) are $C_1$–$C_8$-alkanols, such as methanol, ethanol, propanol and n-butanol.

The novel polyurethane vinyl ethers contain the compounds C) essentially to saturate isocyanate groups which have not reacted with monohydroxyvinyl ethers, so that no free isocyanate is present in the polyurethane vinyl ethers.

The polyurethane vinyl ethers can be prepared by reacting components A), B) and, where relevant, C) in a known manner. 1 NCO equivalent of components A) may simultaneously be reacted with components B) and C).

However, the reaction can also be carried out in stages by first reacting component A) with one of the components B) or C). By monitoring the isocyanate content, it is possible to determine when the amount of components B) or C) used has reacted virtually completely. The reaction with the remaining component can then be carried out, and these components may also be used in excess, based on the isocyanate groups still present.

The reaction of components A) with B) and C) is carried out preferably at from 50 to 150° C., in particular from 70°-120° C., in the presence of a catalyst for urethane formation.

Suitable catalysts are described in, for example, Houben-Weyl, Methoden der organischen Chemie, Vol. XIV/2, page 60 et seq., Georg Thieme-Verlag, Stuttgart (1963), or Ullmann, Encyklopädie der technischen Chemie, Vol. 19, page 306 (1981). Tin-containing compounds, such as dibutyltin dilaurate, tin(II) octoate or dibutyltin dimethoxide, are preferred.

In general, such catalysts are used in an amount of from 0.001 to 2.5, preferably from 0.005 to 1.5%, by weight, based on the total amount of the reactants.

The reaction can also be carried out in the presence of solvents which have no functional groups which are reactive with isocyanate. Examples of particularly suitable solvents are butyl acetate, ethyl acetate and tetrahydrofuran.

The novel polyurethane vinyl ethers are particularly suitable for radiation-curable materials which are used for the production of coatings and moldings.

The radiation-curable materials preferably contain 20–100, particularly preferably 40–100, very particularly preferably 60–100%, by weight of the novel polyurethane vinyl ethers and 0–80, particularly preferably 0–60, very particularly preferably 0–40%, by weight of further radiation-curable compounds which can be subjected to cationic polymerization.

The stated weights relate to the total content of said radiation-curable compounds in the radiation-curable materials.

Further suitable radiation-curable compounds which have been subjected to cationic polymerization are in particular low molecular weight compounds having a molecular weight of less than 500, preferably from 60 to 400. In addition to mono- and polyvinyl ethers, radiation-curable epoxy compounds which can be subjected to cationic polymerization, as disclosed in, for example, EP-B-123 912, are also suitable. Examples are bisphenol A diglycidyl ether and 3',4'-epoxycyclohexylmethyl 3,4-epoxycyclohexanecarboxylate. Vinyl ethers of $C_1$–$C_8$-monohydroxyalkanes or polyvinyl ethers of aliphatic $C_2$–$C_{12}$-polyols having 2–4 hydroxyl groups are preferred.

In the stated polyvinyl ethers of polyols, preferably all hydroxyl groups of the polyols have been converted into vinyl ether groups.

The radiation-curable materials may also contain inert solvents for establishing the processing viscosity. For example, ethyl acetate and butyl acetate are suitable.

The radiation-curable materials may be cured by cationic polymerization. The cationic polymerization may be effected, for example, thermally in the presence of a Lewis acid, such as boron trifluoride, or strong acids, for example oxo acids, such as p-toluenesulfonic acid or trifluoromethylsulfonic acid, as catalysts, or photochemically.

Photochemical curing, i.e. radiation curing by high energy radiation, such as electron beams or UV light, is preferred.

In the case of photochemical curing, onium compounds, for example sulfonium or iodonium compounds, such as triarylsulfonium salts or diaryliodonium salts, are added as catalysts to the radiation-curable materials.

Catalysts for thermal or photochemical curing are preferably added to the radiation-curable materials in an amount of from 0.001 to 10, particularly preferably from 0.2 to 5%, by weight, based on cationically polymerizable compounds.

Curing, i.e. cationic polymerization, is effected in a suitable manner after application of the radiation-curable materials to the desired substrates, for example having surfaces of wood, metal, ceramic, plastic or paper, or after shaping of the radiation-curable materials, for example to give printing plates.

In thermal curing, temperatures of from 50° to 180° C. are preferred.

Electron beam curing is preferably carried out using electron beams having an energy of from 50 to 500 keV. For curing with UV light, commercial UV lamps which emit radiation in a wavelength range from 250 to 400 nm may be preferably used.

Radiation-curing can be carried out in particular after a short preheating time, for example at from 40° to 100° C., before removal of some or all of any solvents used.

The radiation-curable materials can be used, for example, as surface coatings, protective coatings or printing inks, if necessary after the addition of dyes, pigments and further assistants, such as leveling agents.

From the toxicological point of view, the novel radiation-curable materials are in many cases safer to use than radiation-curable materials based on substantially more readily volatile diisocyanates, e.g. toluylene diisocyanate or isophorone diisocyanate.

The coatings and moldings produced using the radiation-curable materials have great hardness after only a short curing time.

EXAMPLE 811 g of a 60% strength by weight solution of an isocyanurate obtained from 3 mol of toluylene diisocyanate and 2 mol of hexamethylene diisocyanate in butyl acetate, containing a total of 2.02 equivalents of NCO (Desmodur® HL from Bayer), were reacted with 220.4 g of butanediol monovinyl ether for 120 minutes at 60° C. in the presence of 0.7 g of dibutyltin dilaurate. After the isocyanate content was constant at 0.49% by weight (0.056 equivalent of NCO) and after butanediol monovinyl ether had been substantially converted, 4 g of methanol were added in order to bind any isocyanate radicals still present.

The resulting solution of the polyurethane vinyl ether is diluted with tetraethylene glycol divinyl ether (TEGDVE) to a viscosity of 2,000 mPa.s, and 1.5% by weight, based on the solids content, of bis-[4-(diphenylsulfonio)-phenyl] sulfide bis-hexafluorophosphate were added as a photoinitiator (KI 85 from Degussa). The solution was applied to glass sheets, and the solvent was evaporated off at 60° C.

The coating (layer thickness 80 μm) was then cured by exposure to a high pressure mercury lamp (from IST) having a power of 120 watt/cm.

The hardness of the coating was evaluated by the pendulum hardness test according to DIN 53,157.

The curing rate was obtained from the rate at which a belt on which the coated substrates lay was moved past the high pressure mercury lamp.

The results are shown in the Table.

COMPARATIVE EXAMPLE 467.4 g of a polyesterdiol, prepared from neopentylglycol and adipic acid and having a molecular weight of 666, were reacted with 388.5 g of isophorone diisocyanate in the presence of 0.8 part of dibutyltin dilaurate at 70° C. After the calculated NCO value of 10.2% by weight (2.09 equivalents of OCN) had been reached, 243.2 g of butanediol monovinyl ether were added at the same temperature. The reaction was continued until the isocyanate value had fallen below 0.1%. To reduce the viscosity, the reaction product was diluted with butyl acetate to a solids content of 75%, after which a processing viscosity of 700 mPa.s was established with TEGDVE.

The subsequent test was carried out as described in the Example (results in the Table).

TABLE

| | % by weight* of polyurethane vinyl ether | % by weight* of TEGDVE | Curing rate m/s | Pendulum hardness s |
|---|---|---|---|---|
| Example | 47 | 53 | 60 | 45 |
| Comparison | 60 | 40 | <2.5** | — |

*Based on the total content of radiation-curable compounds which can be subjected to cationic polymerization
**Not cured completely

We claim:
1. A polyurethane vinyl ether, obtainable by reacting
   A) 1 NCO equivalent of one or more isocyanurate-containing polyisocyanates with
   B) 0.01–1.0 OH equivalent of one or more monohydroxyvinyl ethers and
   C) 0–0.99 equivalent of functional groups of further compounds, which groups are reactive with OCN.
2. A polyurethane vinyl ether as claimed in claim 1, wherein the isocyanurate-containing polyisocyanates A) are composed of a total of
   10–90 mol % of a $C_2$–$C_8$-alkylene diisocyanate and
   10–90 mol % of a $C_6$–$C_{16}$-arylene or alkylarylene diisocyanate.
3. A polyurethane vinyl ether as claimed in claim 1, wherein the monohydroxyvinyl ethers B) are monohydroxy-$C_1$–$C_8$-alkyl vinyl ethers.
4. A polyurethane vinyl ether as claimed in claim 1, wherein the further compounds C) are $C_1$–$C_8$-alkanols.
5. A radiation-curable material containing a polyurethane vinyl ether as claimed in claim 1.
6. A substrate coated with a radiation-curable material as claimed in claim 5.
7. A molding of a radiation-curable material as claimed in claim 5.
8. A process for the production of coatings and moldings, wherein a radiation-curable material as claimed in claim 5 is cured by high energy radiation with the addition of a photoinitiator for the cationic polymerization.

* * * * *